US007886659B2

(12) United States Patent
Lagares Corominas

(10) Patent No.: US 7,886,659 B2
(45) Date of Patent: Feb. 15, 2011

(54) AUTOMATIC PLANT FOR THE TREATMENT AND PACKING OF MEAT PRODUCT

(75) Inventor: Narcis Lagares Corominas, Girona (ES)

(73) Assignee: Metalquimia, S.A., Girona (ES)

( * ) Notice: Subject to any disclaimer, the term of this patent is extended or adjusted under 35 U.S.C. 154(b) by 441 days.

(21) Appl. No.: 11/596,377

(22) PCT Filed: May 12, 2005

(86) PCT No.: PCT/ES2005/000257

§ 371 (c)(1),
(2), (4) Date: Nov. 14, 2006

(87) PCT Pub. No.: WO2005/110106

PCT Pub. Date: Nov. 24, 2005

(65) Prior Publication Data

US 2008/0065250 A1    Mar. 13, 2008

(30) Foreign Application Priority Data

May 14, 2004    (ES) ............................... 200401246

(51) Int. Cl.
*B02B 3/00*    (2006.01)
(52) U.S. Cl. .............................. 99/532; 99/535; 53/202; 53/517; 53/567
(58) Field of Classification Search ............... 99/487, 99/532–535, 516, 472, 486, 494, 356, 348, 99/352–355, 517, 467, 485, 489; 366/44, 366/45, 185; 452/233, 141–145; 100/910; 426/392, 412, 414, 231–233, 302, 506, 519, 426/518, 520, 524, 281, 641, 644, 645, 646; 53/517, 567, 576, 202
See application file for complete search history.

(56) References Cited

U.S. PATENT DOCUMENTS 4,690,046 A  *  9/1987  Corominas ................... 99/533

(Continued)

FOREIGN PATENT DOCUMENTS

EP        455611         6/1991

(Continued)

OTHER PUBLICATIONS

Lagares Corominas Narcis, WO 02/094025 EPO Translation, Nov. 28, 2002.*

(Continued)

*Primary Examiner*—Tu B Hoang
*Assistant Examiner*—Hemant Mathew
(74) *Attorney, Agent, or Firm*—RatnerPrestia

(57) ABSTRACT

An automatic plant for the treatment and packing of meat product, including an injection station for injecting brine into a meat product, first and second maceration stations for macerating the injected meat product, and a packing station for packing the treated meat product. The injection station is connected to the first and second maceration stations by an accumulating and loading unit for accumulating meat product coming from the injection station and selectively loading it into the first and second maceration stations which are connected to the packing station by a transfer unit adapted for transferring the meat product from the first and second maceration stations to feed hoppers for feeding the packing station. The plant is controlled by computerized control.

22 Claims, 1 Drawing Sheet

U.S. PATENT DOCUMENTS

| | | | | |
|---|---|---|---|---|
| 4,791,705 | A * | 12/1988 | Corominas | 452/141 |
| 4,958,410 | A * | 9/1990 | Lagares | 452/141 |
| 5,083,507 | A * | 1/1992 | Van Haren | 99/472 |
| 5,269,216 | A * | 12/1993 | Corominas | 99/356 |
| 5,342,235 | A * | 8/1994 | Watanabe | 452/141 |
| 5,374,437 | A * | 12/1994 | Lagares Corominas | 426/392 |
| 5,507,221 | A * | 4/1996 | Lagares-Corominas | 99/532 |
| 5,537,916 | A * | 7/1996 | Lagares-Corominas | 99/356 |
| 5,564,332 | A * | 10/1996 | Ludwig | 99/472 |
| 5,881,640 | A * | 3/1999 | R.ae butted.vsager | 99/533 |
| 5,947,015 | A * | 9/1999 | Laurbak | 99/535 |
| 5,972,398 | A * | 10/1999 | Ludwig et al. | 426/281 |
| 6,467,403 | B1 * | 10/2002 | Lagares-Corominas | 99/472 |
| 6,595,846 | B1 * | 7/2003 | Lagares Corominas | 452/141 |
| 6,901,850 | B2 * | 6/2005 | Corominas | 99/533 |
| 7,024,988 | B2 * | 4/2006 | Corominas | 99/532 |
| 7,077,057 | B1 * | 7/2006 | Lagares Corominas | 99/532 |
| 2004/0237804 | A1 * | 12/2004 | Corominas | 99/532 |
| 2005/0034612 | A1 * | 2/2005 | Corominas | 99/532 |

FOREIGN PATENT DOCUMENTS

| | | |
|---|---|---|
| EP | 455611 A1 * | 11/1991 |
| EP | 1 402 782 | 3/2004 |
| EP | 1402782 A1 * | 3/2004 |
| ES | 8705198 | 7/1987 |
| WO | WO 99/63832 | 12/1999 |
| WO | WO 9963832 A1 * | 12/1999 |
| WO | WO 01/62096 | 8/2001 |
| WO | WO 0162096 A1 * | 8/2001 |
| WO | WO 02/094025 | 11/2002 |
| WO | WO 02094025 A1 * | 11/2002 |

OTHER PUBLICATIONS

International Search Report for PCT International Application No. PCT/ES 2005/000257 mailed Sep. 22, 2005.

* cited by examiner

AUTOMATIC PLANT FOR THE TREATMENT AND PACKING OF MEAT PRODUCT

This application is a U.S. National Phase application of PCT International Application No. PCT/ES2005/000257 filed May 12, 2005.

FIELD OF THE ART

The present invention generally relates to an automatic plant for the treatment and packing of meat product in a substantially continuous regime, and more specifically to a plant with two maceration stations for macerating previously injected meat product and at least one packing station for packing the treated meat product.

STATE OF THE PRIOR ART

International patent application WO 02/94025 of this applicant discloses an automatic plant for the treatment and packing of meat product in a continuous regime comprising an injection station for injecting brine into the meat product to be treated, a maceration station for macerating the previously injected meat product, and a packing station for packing the treated meat product. The three stations are arranged in series and connected by an accumulating and loading unit to accumulate injected meat product from the injection station and loading it by batches into said maceration station, and a transfer unit for transferring treated meat product from the maceration station to a one or more hoppers from which the treated meat product is fed to said packing station. The plant comprises computerized control means for coordinating the operation of the mentioned stations and units for the purpose of maintaining a substantially continuous production regime.

In the plant described in the mentioned document, the time required by the maceration station to process a batch of meat product is generally greater than the time that the injection station uses to inject the meat product corresponding to the next batch, and is also greater than the time that the packing station uses to package the meat product corresponding to the previous batch. Therefore, plant productivity is determined by the capacity of the maceration station. However, an increase in the production capacity of the maceration station is a result of increasing its physical size, which has a limit which, if surpassed, results in the unit being inoperative and/or not cost effective.

Therefore, the need exists for an automatic plant for the treatment and packing of meat product providing greater productivity while at the same time preventing possible down times in the injection and packing units.

SUMMARY OF THE INVENTION

The present invention contributes to satisfy the previous and other needs by providing an automatic plant for the treatment and packing of meat product, of the type comprising, at least one injection station for injecting brine into the meat product to be treated; at least one maceration station for macerating injected meat product, including a rotating drum for massaging the meat product, adapted to tip the meat product from the inside thereof into a plurality of tanks suitable for housing meat product, and a loading-reloading device for transferring meat product from said tanks to said rotating drum; at least one packing station for packing the treated meat product; at least one accumulating and loading unit for accumulating injected meat product coming from said injection station and loading it by batches into said at least one maceration station; and a transfer unit for transferring treated meat product from the maceration station to at least one hopper from which the treated meat product is fed to said packing station, computerized control means being arranged for coordinating the operation of the mentioned stations and units maintaining a substantially continuous production regime. The plant of the invention is characterized in that it further comprises a second maceration station for macerating the injected meat product, including a second rotating drum for massaging the meat product, adapted to tip the meat product from the inside thereof into a plurality of second tanks suitable for housing meat product, and a second loading-reloading device for transferring meat product from said second tanks to said second rotating drum; a distributing device, associated to said accumulating and loading unit, for selectively distributing batches of injected meat product to one or more of said first tanks of the mentioned first maceration station and/or to one or more of said second tanks of the mentioned second maceration station; and a collecting device, associated to said transfer unit, for selectively transferring treated meat product from the first maceration station or from the second maceration station to said at least one hopper.

The previous features of the invention as well as other additional features described in the dependent claims make the plant have a very increased productivity with respect to a plant of the previous art having a maceration station of the same size. In addition, a single injection station feeds injected meat product to both first and second maceration stations according to a substantially continuous meat product input regime while at the same time a single packing station packs the treated meat product coming from both first and second maceration stations according to a substantially continuous meat product output regime.

BRIEF DESCRIPTION OF THE DRAWINGS

The previous and other advantages and features of the present invention will be more fully understood from the following detailed description of an exemplary embodiment in reference to the attached drawings, in which.

DETAILED DESCRIPTION OF AN EXEMPLARY EMBODIMENT

Figure 1:
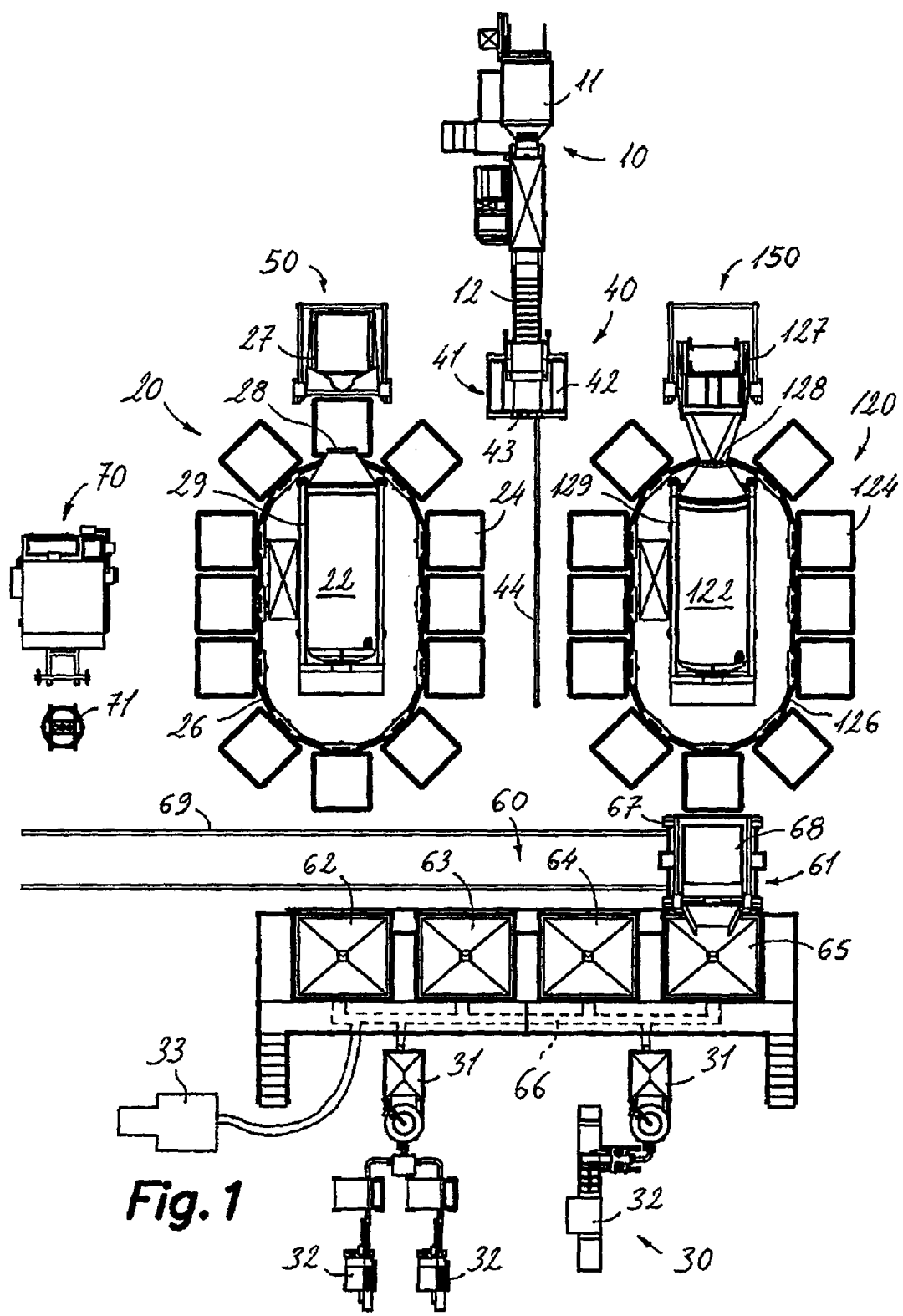
FIG. 1 (only FIGURE) shows a schematic plan view of an automatic plant for the treatment and packing of meat product according to the present invention.

With reference to FIG. 1, the automatic plant for the treatment and packing of meat product according to the present invention comprises an injection station 10 for injecting brine into the meat product to be treated, first and second maceration stations 20, 120 for macerating injected meat product, and a packing station 30 for packing the treated meat product. The injection station 10 is connected to said first and second maceration stations 20, 120 by means of an accumulating and loading unit 40 that is able to accumulate injected meat product coming from said injection station 10 and loading it by batches into the first and second maceration stations 20, 120, whereas the first and second maceration stations 20, 120 are connected to the packing station 30 by means of a transfer unit 60 adapted for transferring treated meat product from the first and second maceration stations 20, 120 to hoppers 62, 63, 64, 65 from which the treated meat product is fed to said packing station 30. The plant is automatically controlled by computerized control means adapted for coordinating the operation of the mentioned stations and units maintaining a substantially continuous production regime, at least at the entrance to the injection station 10 and at the exit of the packing station 30, although the treatment in the first and second maceration stations 20, 120 is carried out by batches.

Each of the first and second maceration stations 20, 120 includes a rotating drum 22, 122 for massaging the injected meat product, and a plurality of tanks 24, 124 suitable for housing meat product distributed around the corresponding rotating drum and connected to driving means associated to guiding means 26, 126. The mentioned driving means can be like those described in the cited international patent application WO 02/94025, and are actuated to make the tanks 24, 124 move forward step by step along a closed path around the respective rotating drum 22, 122. At each stop between steps, one of the tanks 24, 124 is located under a loading-unloading mouth 28, 128 of the rotating drum 24, 124. Each rotating drum 24, 124 is assembled on a corresponding tilting frame 29, 129 actuated to tilt the drum for the purpose of pouring, in collaboration with a rotational movement of the drum, its content through said loading-unloading mouth 28, 128 into one of said tanks 24, 124 located thereunder. A tilting structure useful for the present invention for mounting the rotating drum 24, 124 is described in international patent application WO 99/63832 of this applicant.

Each first and second maceration station 20, 120 also includes a corresponding first and second loading-reloading device 50, 150 for transferring the injected or massaged-settled meat product from the respective first or second tanks 24, 124 to said first or second rotating drum 22, 122, which allows alternating successive massage and settling treatments for each batch of meat product. Such first and second loading-reloading devices 50, 150 are facing to the loading-unloading mouth 28, 128 of the respective rotating drums 22, 122, and each one includes a lifting and tipping apparatus 27, 127 adapted for seizing the first or second tank 24, 124 facing thereto, lifting it and tipping it so as to pour its content inside the respective first or second rotating drum 22, 122 through its loading mouth 28, 128, and to then return the first or second tank 24, 124 to the driving means associated to the first or second path 26, 126. It will be understood that the first tank 24 of the first maceration station 20 and second tank 124 of the second maceration station 120 located under the loading-unloading mouth 28, 128 of the respective first and second rotating drum 22, 122 at each stop between steps are the same first and second tanks 24, 124 which are facing to the respective first and second loading-reloading devices 50, 150. A lifting and tipping apparatus useful for use in the plant of the present invention is described in international patent application WO 02/94025 cited above. FIG. 1 shows the lifting and tipping apparatus 127 of the second loading-reloading device 150 in the moment of tipping the content of one of the second tanks 124 in collaboration with funnel means associated to the second loading-reloading device 150 itself.

The mentioned accumulating and loading unit 40 has a distributing device 41 associated thereto for selectively distributing batches of injected meat product to one or more of the first tanks 24 of the first maceration station 20 and/or to one or more of the second tanks 124 of the second maceration station 120. To that end, the mentioned first and second closed paths determined respectively by said first and second guiding means 26, 126 have respective sections in which, at each stop between steps, one or more of the first tanks 24 of the first maceration station 20 and one or more of the second tanks 124 of the second maceration station 120 are parked. In the illustrated embodiment, several pairs of tanks, each of which is formed by one first tank 24 of the first maceration station 20 and one second tank 124 of the second maceration station 120, mutually facing to one another, are parked in said opposite sections of the first and second closed paths 26, 126 at each stop between steps.

The mentioned distributing device 41 comprises a container 42 mounted on a truck 43 actuated so as to move along a guide rail 44 extending between both opposite sections of the first and second closed paths 26, 126. Therefore said container 42 is drawn by the mentioned truck 43 between a loading position, located to receive injected meat product from a conveyor device 12 connected to the outlet of an injecting machine 11 installed in the injection station 10, and several unloading positions, located between the first and second tanks 24, 124 of the first and second maceration stations 20, 120 forming each pair. In each of these unloading positions, tilting means included in the truck 43 can make said container 42 tilt to one side or the other for the purpose of selectively unloading the meat product to one or the other of the mutually opposite first and second tanks 24, 124.

Therefore, the initial loading of the rotating drum 22, 122 is done through the distributing device 41, tanks 24, 124 and loading-reloading device 50, 150. Subsequent settling and massage cycles are carried out by transferring the meat product from the rotating drum 22, 122 to the tanks 24, 124 directly through the loading-unloading mouth 28, 128, and from the tanks 24, 124 again to the rotating drum 22, 122 via loading-reloading device 50, 150.

Obviously, more than one injecting machine 11 could be installed in the injection station 10, and this or these machines can be of any one of the types well known in the prior art. On the other hand, only one pair of opposite first and second tanks 24, 124 could be parked in the opposite sections of the first and second closed paths 26, 126, in which case the truck 43 would have a single unloading position, or it could be more than three pairs.

On the other hand, the mentioned transfer unit 60 has a collecting device 61 associated thereto that is able to selectively transfer treated meat product from the first maceration station 20 or from the second maceration station 120 to any one of said hoppers 62, 63, 64, 65. The plant could obviously operate the same with a single suitably sized feed hopper for feeding the packing station, although the arrangement of several hoppers allows greater flexibility in the operations, even allowing carrying out different treatments and/or treatments of different products in the first and second maceration stations 20, 120.

The mentioned collecting device 61 comprises a moving structure 67 actuated so as to move along a path, guided by one or more guide rails 69 laid out along said path.

Mounted on said moving structure 67 there is a lifting and tipping apparatus 68 adapted to seize a first or second tank 24, 124 from its respective first or second maceration station 20, 120, drawing it to a position opposite to one of said hoppers 62, 63, 64, 65, lifting it and tipping it to pour its content inside the selected hopper. To that end, the previously mentioned first and second closed paths determined respectively by the first and second guiding means 26, 126 of the first and second maceration stations 20, 120 have respective sections in which, at each stop between steps, at least one of the first tanks 24 of the first maceration station 20 and at least one of the second tanks 124 of the second maceration station 120 are parked, which tanks are apposite to said path of the moving structure 67 and available to be seized by said lifting and tipping apparatus 68. The lifting and tipping apparatus 68 of the transfer unit 60 is similar to the lifting and tipping apparatus 27, 127 of the first and second loading-reloading device 50, 150 mentioned above, although here the seizing of the tanks is done at the side opposite to the tipping side thereof.

In the illustrated embodiment, the packing station 30 comprises a pair of stuffing-dosing machines 31, each of which is connected to a packing line including one or more automatic packing machines 32. The packing station also has feeding means 66 incorporated thereto for selectively feeding each of said stuffing-dosing machines 31 with previously treated meat product from any one of said hoppers 62, 63, 64, 65. The packing machines 32 connected to each of the stuffing-dosing machines 31 can be of the same type or different types, for example for packing different products or in different package types. Obviously, the packing station 30 could also comprise a single stuffing-dosing machine 31 or more than two. The packing station (30) could also have one or more manual packing devices 33 coupled thereto for packing high-quality products not suitable for being packed by a stuffing-dosing machine exclusively or simultaneously with one or more stuffing-dosing machines 31 and packing machines 32.

The plant is besides completed with at least one automatic cleaning unit 70 adapted for cleaning the tanks 24, 124. In the embodiment shown in the FIGURE, the guide rails 69 defining the mentioned path of the moving structure 67 extend to an area facing a transfer device 71 associated to said automatic cleaning unit 70. The mentioned transfer unit 60 is adapted so as to seize a first or second tank 24, 124 drawn by the lifting and tipping apparatus 68 assembled in the moving structure 67 and transferring it, for example, by means of a 180° turn to the automatic cleaning unit 70 for its washing. Once clean, the first or second tank 24, 124 is returned by means of a reverse operation to the lifting and tipping apparatus 68, which gives it back to its position on the driving means associated to the corresponding first or second guiding means 26, 126 of the respective first or second maceration station 20, 120.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. An automatic plant for the treatment and packing of meat product, comprising:
   at least one injection station for injecting brine into a meat product to be treated;
   first and second maceration stations for macerating said meat product, including respective first and second rotating drums for massaging the meat product and adapted to tip the meat product from the inside thereof into a plurality of respective first and second tanks suitable for housing the meat product, and respective first and second loading-reloading devices for transferring the meat product from said first and second tanks respectively to said first and second rotating drums;
   an accumulating and loading unit associated with a distributing device for accumulating the meat product coming from said injection station and for selectively loading batches of the meat product into one or more of said first and/or second tanks of said respective first and second maceration stations;
   a transfer unit associated with a collecting device for selectively transferring the meat product from the first or second maceration station to at least one hopper;
   at least one packing station for packing the meat product coming from said at least one hopper; and
   computerized control means for coordinating operation of said injection station, said first and second maceration stations, said accumulating and loading unit, said transfer unit and said packing station so as to maintain a substantially continuous production regime,
   wherein said distributing device comprises a container assembled in a truck actuated so as to draw said container between a loading position, located to receive said meat product coming from the injection station, and at least one unloading position, located to unload the meat product to one of the first and second tanks of the first and second maceration stations; and
   wherein the first and second maceration stations comprise respective first and second loading-reloading devices for directly transferring the meat product from each first and second tank to the inside of the respective one of the first and second rotating drum through a loading mouth thereof.

2. The plant according to claim 1, wherein said plurality of first and second tanks are distributed around the respective first and second rotating drums and connected to first and second driving means associated with respective first and second guiding means so as to make them move step by step along respective first and second closed paths around the corresponding first and second rotating drums, said first and second closed paths having respective facing sections in which at least one of the first tanks of the first maceration station and at least one of the second tanks of the second maceration station are parked at each stop between steps facing to one another.

3. The plant according to claim 2, wherein said at least one container unloading position is located between the first and second tanks which are parked in said mutually facing sections of the first and second closed paths, said truck including tilting means to make the container tilt to opposite sides for the purpose of selectively unloading the meat product to one or the other of the mutually facing first and second tanks.

4. A plant according to claim 2, wherein several pairs of mutually facing first and second tanks of said plurality of first and second tanks are parked in said facing sections of the first and second closed paths at said each stop between steps, and said at least one unloading position of the truck comprises several unloading positions, each between the first and second tanks of each pair, said truck including tilting means to make the container tilt to one side or the other for the purpose of selectively unloading the meat product to one or the other of the mutually facing first and second tanks of each pair.

5. The plant according to claim 3, wherein the truck is actuated so as to be moved between the loading position and the at least one unloading position along at least one guide rail.

6. The plant according to claim 2, wherein said collecting device associated to said transfer unit comprises a moving structure actuated so as to be moved along a path, a lifting and tipping apparatus being mounted on said moving structure and adapted to seize a first or second tank of said plurality of first and second tanks from its respective first or second maceration station of said first and second maceration stations, draw it, lift it and tip it so as to pour its content into the inside of said at least one hopper.

7. The plant according to claim 6, wherein said first and second closed paths have respective sections in which at least one of the first tanks of the first maceration station and at least one of the second tanks of the second maceration station are facing to said path of the moving structure and available for being seized by said lifting and tipping apparatus at each stop between steps.

8. The plant according to claim 6, wherein said at least one hopper of the transfer unit comprises a plurality of hoppers facing said path of the moving structure and available so that the lifting and tipping apparatus can selectively pour the content of the first or second tank into the inside of any of said hoppers.

9. The plant according to claim 6, further comprising at least one automatic cleaning unit for cleaning the first and second tanks associated to a transfer device facing said path of the moving structures, said transfer unit being adapted to seize a first or second tank of said plurality of first and second tanks from the lifting and tipping apparatus and to transfer it to the automatic cleaning unit and to return it once it is cleaned to the lifting and tipping apparatus.

10. The plant according to claim 6, wherein said moving structure is adapted to be moved guided along at least one guide rail laid out along said path.

11. The plant according to claim 8, wherein said at least one packing station comprises at least one stuffing-dosing machine connected to a packing line including at least one packing machine, feeding means being incorporated for feeding said meat product to said stuffing-dosing machine selectively from any one of said hoppers.

12. The plant according to claim 8, wherein said at least one packing station comprises several stuffing-dosing machines, each connected to a packing line including at least one packing machine, feeding means being incorporated for feeding meat product to each of said stuffing-dosing machines selectively from any one of said hoppers.

13. The plant according to claim 8, wherein said at least one packing station has at least one manual packing device coupled thereto for the packing of high-quality products not suitable for being packed by a stuffing-dosing machine.

14. The plant according to claim 2, wherein said first and second closed paths have respective sections in which at least one of the first tanks of the first maceration station and at least one of the second tanks of the second maceration station are respectively facing, at said each stop between steps, said first and second loading-reloading devices, each of the first and second loading-reloading devices comprising a lifting and tipping apparatus adapted to seize the first or second tank facing thereto, lift it and tip it so as to pour its content into the inside of the respective first or second rotating drum through a said loading mouth thereof.

15. The plant according to claim 14, wherein said first and second rotating drums are mounted on respective tilting frames independently actuated so as to tilt the respective first or second rotating drum for the purpose of pouring their content into the first or second tank facing thereto in collaboration with a rotating movement of the first or second rotating drum.

16. The plant according to claim 2, wherein said at least one unloading position of the truck comprises several unloading positions in which unloading of the meat product is carried out selectively into any of first and second tanks of said plurality of first and second tanks parked, at said each stop between steps, in sections of said first and second closed paths determined respectively by said first and second guiding means.

17. The plant according to claim 4, wherein the truck is actuated so as to be moved between the loading position and the unloading position or positions along at least one guide rail.

18. The plant according to claim 7, further comprising at least one automatic cleaning unit for cleaning the first and second tanks associated to a transfer device facing said path of the moving structure, said transfer unit being adapted to seize a first or second tank of said plurality of first and second tanks from the lifting and tipping apparatus and to transfer it to the automatic cleaning unit and to return it once it is cleaned to the lifting and tipping apparatus.

19. The plant according to claim 7, wherein said moving structure is adapted to be moved guided by at least one guide rail laid out along said path.

20. The plant according to claim 8 further comprising at least one automatic cleaning unit for cleaning the first and second tanks associated to a transfer device facing said path of the moving structure, said transfer unit being adapted to seize a first or second tank of said plurality, of first and second tanks from the lifting and tipping apparatus and to transfer it to the automatic cleaning unit and to return it once it is cleaned to the lifting and tipping apparatus.

21. The plant according to claim 8, wherein said moving structure is adapted to be moved guided by at least one guide rail laid out along said path.

22. The plant according to claim 9, wherein said moving structure is adapted to be moved guided by at least one guide rail laid out along said path.

* * * * *